United States Patent [19]

Maisenhalder

[11] Patent Number: 4,971,393

[45] Date of Patent: Nov. 20, 1990

[54] SITTING FURNITURE, ESPECIALLY FOR AUTOMOBILE SEATS

[75] Inventor: Siegfried Maisenhalder, Langenhagen, Fed. Rep. of Germany

[73] Assignee: Ralph Stas, Belle Mead, N.J.

[21] Appl. No.: 320,326

[22] Filed: Mar. 8, 1989

[30] Foreign Application Priority Data

Nov. 27, 1988 [DE] Fed. Rep. of Germany ....... 3841024

[51] Int. Cl.$^5$ .............................................. A47C 7/38
[52] U.S. Cl. ................................... 297/397; 297/391; 297/408; 248/118
[58] Field of Search ................ 297/391, 397, 406–409, 297/403; 248/118; 403/109, 377

[56] References Cited

U.S. PATENT DOCUMENTS

| 522,192 | 7/1894 | Browne | 297/407 |
|---|---|---|---|
| 2,306,334 | 12/1942 | Costas | 297/407 |
| 2,642,927 | 6/1953 | Rising | 297/398 |
| 2,652,101 | 9/1953 | Samsky et al. | 297/403 X |
| 3,730,589 | 5/1973 | Lane | 297/391 |
| 4,205,878 | 6/1980 | Wooten | 297/406 X |
| 4,796,953 | 1/1989 | Pereira | 297/409 X |
| 4,881,777 | 11/1989 | Dorshimer | 297/408 X |

Primary Examiner—Peter R. Brown
Attorney, Agent, or Firm—Kaplan Blum

[57] ABSTRACT

A lateral head-rest for seating furniture is provided consisting of a soft-elastic cylindrical body, which is mounted on a carrying element through a slotted hole. The carrying element is connected with a clamping device consisting of a front and a rear bar, which show recesses facing each other. The two bars can be screwed together and be clamped to the supporting tubes of a neck-rest.

12 Claims, 2 Drawing Sheets

SITTING FURNITURE, ESPECIALLY FOR AUTOMOBILE SEATS

BACKGROUND OF THE INVENTION

The invention concerns a lateral head-rest for seating furniture, in particular automobile seats, which can be swivelled from a position of disuse to a service position.

Such a lateral head-rest is shown by DE-PS 30 39 934. Via a horizontal axle, this lateral head-rest is connected with a neck-rest, and can be swivelled from a position of disuse to a service position; the lateral head-rest consisting of two components can be pulled out in order to provide a greater contact surface.

Basically, such a lateral head-rest fulfills the general desire to support one's head e.g. during a car ride. So the head can no longer fall aside due to fatigue, and can no longer stress the cervical vertebrae and the nerves emerging at the back bone of the head, so that altogether there will be a positive influence on the sitting position.

The lateral head-rest, which became known by the a.m. patent, features, however, the shortcoming that it forms an integrated whole with the neck-rest, so that this equipment is not suitable for subsequent fitting to automobile seats without lateral head-rests.

In the patent application P 38 28 342 originating from the applicant, which has not been pre-published, it has been proposed already to attach the lateral head-rest to a holding device consisting of a square tube which is provided with holes, through which the supporting tubes of the neck-rest should be guided.

Attachment of such a lateral head-rest requires, therefore, that the neck-rest must be removed, before the lateral head-rest or respectively the holding device being operatively connected with the lateral head-rest can be mounted. In particular for laymen this is not quite easy, sometimes even the use of tools may be necessary.

SUMMARY OF THE INVENTION

Therefore, it is the task of the present invention on the one hand to remove the shortcomings of a lateral head-rest which is firmly connected with the neck-rest, and on the other hand to simplify the operations for assembly.

This is solved by the invention by means of the characteristic features of claim 1. In the subclaims some advantageous developments of the idea of the invention are described.

BRIEF DESCRIPTION OF THE DRAWINGS

An example of the invention shall be explained in detail by means of drawings. Here the following is shown.

DESCRIPTION OF THE PREFERRED EMBODIMENTS

Figure 1:
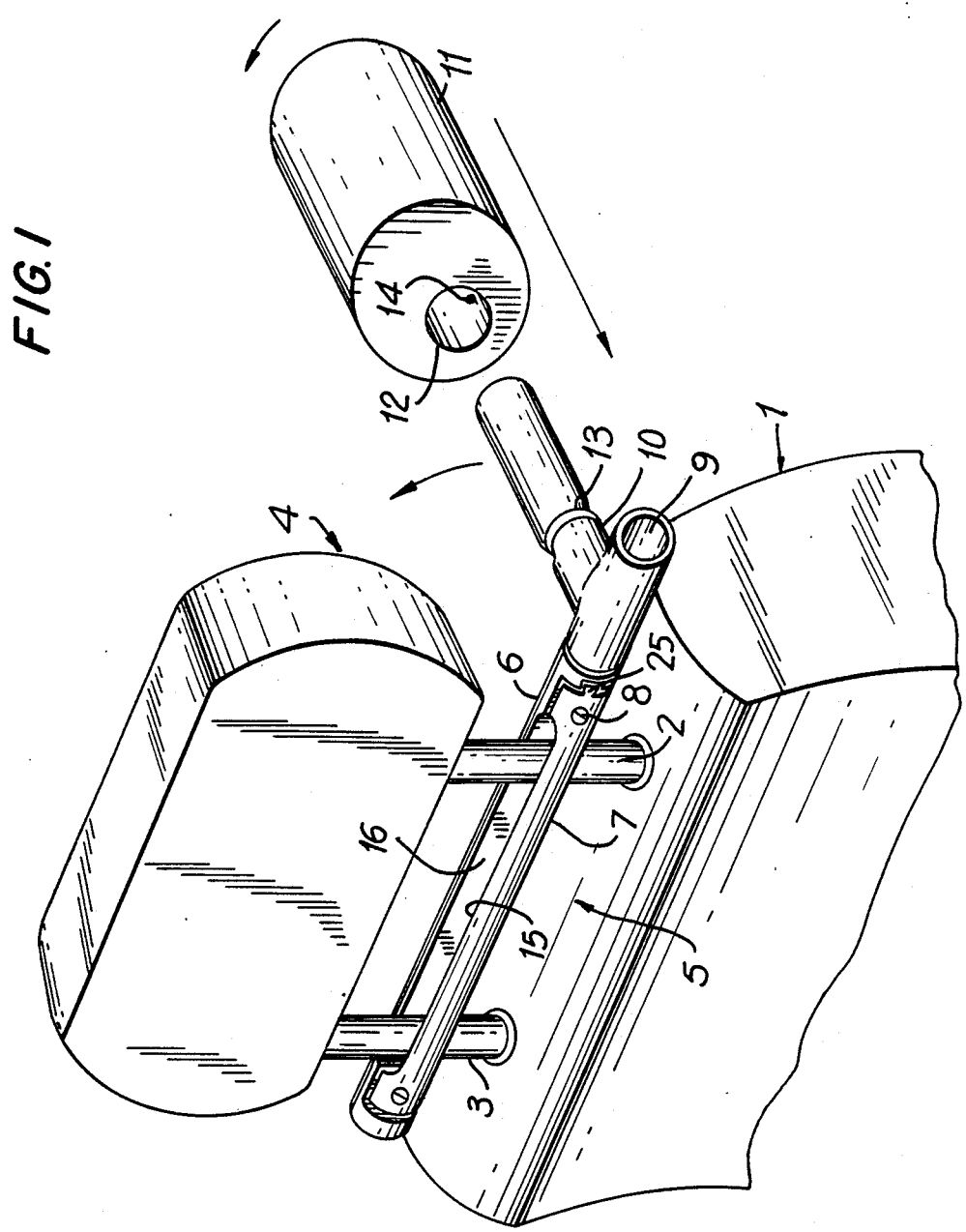
FIG. 1 Perspective view from the rear of a neck-rest with lateral head-rest attached, FIG. 2 Section of the lateral head-rest with clamping device as shown by FIG. 1, and FIG. 3 An example of the telescopic design of a lateral head-rest firmly attached to the clamping device, the upper part showing the lateral head-rest pulled out (service position) and the lower part showing it pushed together (position of disuse).

In FIG. 1, (1) designates the back of a car seat. In the upper section of the back(1) supporting tubes(2,3) are arranged, which carry a neck-rest(4), and which permit vertical adjustment of the neck-rest(4) in the desired position. To the supporting tubes(2,3) a clamping device is attached which consists of a front bar(6) and a rear bar(7). The rear bar(7) is secured to the front bar(6) by means of screws(8) in such a way that the supports(2,3) are clamped. On one side, the front bar(6) is provided with an axle(9), to which a carrying element(10) is pivotally attached. By means of devices not shown here the carrying element(10) is coupled with the axle(9) in such a way that in hinged down position—as shown by FIG. 1—and also in the hinged up position it engages with the axle(9).

A head-rest(11) of nearly cylindrical shape and made from a soft-elastic material, which supports the head of a sitting person laterally, can be pushed onto the carrying element (10). The head-rest(11) is mounted on the carrying element (10) with the aid of a slotted hole(12) inside the headrest. In order to make the head-rest engage with the carrying element(10) when pushed on, the carrying element(10) is provided with a circular groove(13), which a spring element arranged inside the slotted hole(12) engages in.

When the lateral head-rest is not used, it is hinged up, in order not to impede getting into or out of the automobile. In order to bring the lateral head-rest(11) into service position, it is simply hinged down, where it engages—as already mentioned above. In order to make individual adjustment of the lateral head-rest(11) to the head of the user possible, the slotted hole(12) is arranged eccentrically in the head-rest(11), so that by turning the head-rest(11) it can be moved more or less close to the user's head.

Both the front bar(6) and the rear bar(7) are provided with recesses(15,16) facing each other in order to provide the space to receive the supports(2,3). The recesses are intended to cover the total width of the bars, in order e.g. to attach the clamping device(5) also to such supports which do not consist of tubes but of a compact flat supporting element.

It is even possible with these recesses to attach the clamping device(5) for example directly to head-rests which being an integral part of the back have been formed from the back of the seat as a narrowing part. Due to the fact that the neck-rests(4) are of elastic design, when mounting the clamping device(5) the bars(6,7) can be pressed into the soft-elastic material so far that they do not appear to the user as a troublesome obstacle or even as a source of danger.

FIG. 2 shows once again a section of the clamping device (5) with the lateral head-rest(11). According to another proposal of the invention the material of both the headrest(11) and the clamping device(5) should be a soft-elastic material, in order to preclude any risk of injury. In order to give the complete unit in such a case sufficient mechanical strength, the front bar(6) as well as the rear bar(7) contain a core(17), e.g. from metal. This core can at the same time serve as axle(9). The core(17) is incorporated into the manufacturing process already when foaming the material consisting e.g. of soft polyurethane.

In order to prevent the front bar(6) from tilting when joining it with the rear bar(7), dovetailed guide elements(25) may be provided for at least on one side.

Figure 2:
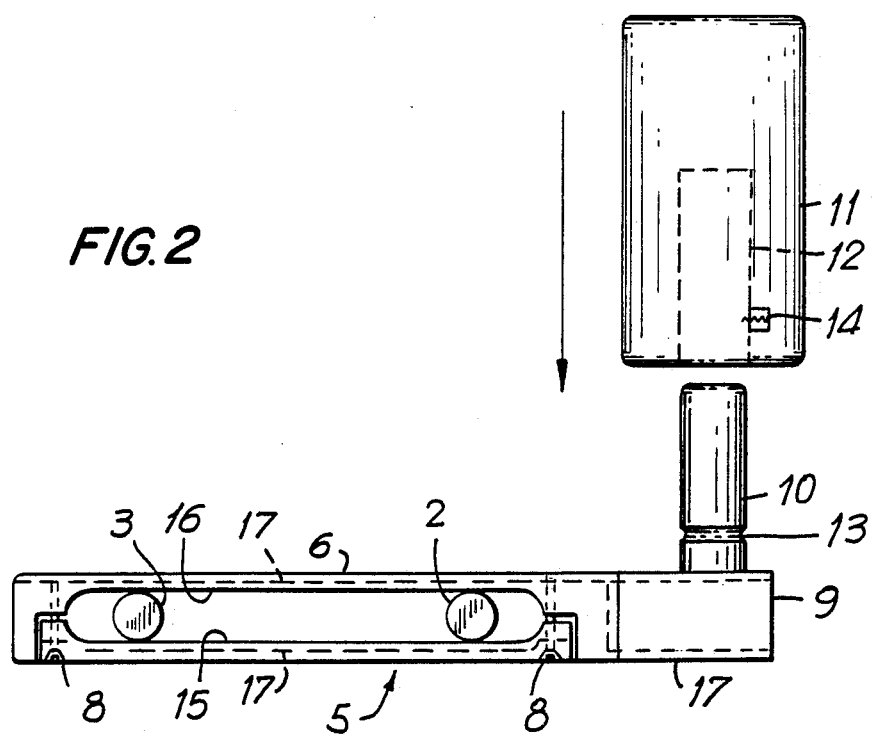

In FIG. 1 as well as in FIG. 2 the head-rest has been made from a uniform molded body. The invention covers, however, also a solution as shown by FIG. 3, which means that the carrying element is firmly connected with the clamping device, i.e. not pivoted; on the carrying element a head-rest is mounted, the position of which may be changed like that of a telescope from pushed together, which marks the position of disuse, to pulled out, which marks the service position.

Figure 3:
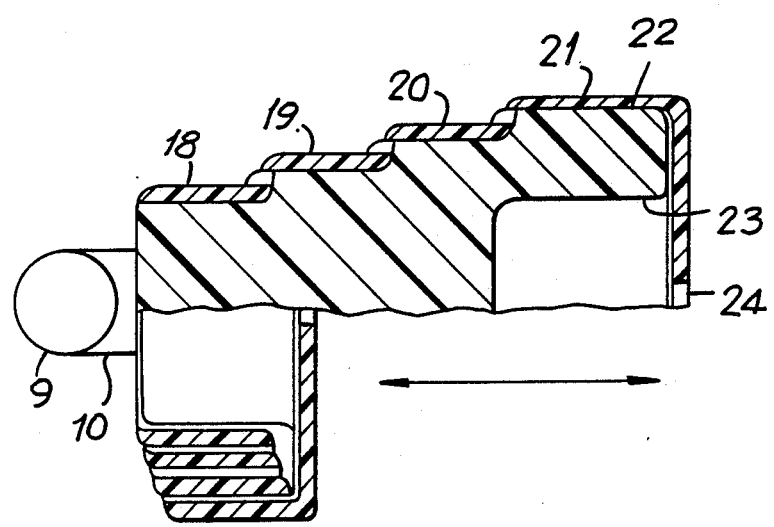

In FIG. 3 telescope sections(18,19,20,21) are shown, which are covered by a soft-elastic layer(22). The outer section(21) is provided with an inside pot to keep the complete unit form-locking when pushed together. On the face of the front section(21), a hole(24) may be provided for, which the user puts his finger in e.g. in order to pull the head-rest(11) out from the position of disuse to service position.

Another proposal of the invention is not shown here. This proposal concerns a front bar, which may be a continuously cast part, and which has a dovetailed slot in the front or rear part, to which the lateral head-rest(11) is attached by an angle, which is fitted to the carrying element(10) and corresponds with the contour of the dovetailed slot, being inserted into the slot. A compression joint may be provided between slot and angle, so that the position taken can even be fixed.

Assembly of the lateral head-rest(11) and/or its clamping device(5) is most simple: At first the neck-rest(4) is to be pulled out of the back-rest(1) so far that there is at least a space which corresponds to the height of the clamping device(5). Then the front(6) and rear bars(7) are placed around the supporting tubes(3) and screwed together in such a way that a compression joint is obtained between the supports(2,3) and the bars(6,7). The lateral head-rest(11) attached to the carrier element(10) is brought to service position and, if necessary, turned so that it takes an anatomically suitable position for the user.

What is claimed is:

1. A lateral head-rest assembly for seating furniture including a neck-rest mounted to the seating furniture by supporting tubes received in the seating furniture which comprises:

substantially L-shaped clamping means for releasably securing the lateral headrest assembly to the supporting tubes, said clamping means including an elongated support bar and a carrying element pivotally connected to the support bar at a first end thereof so that the carrying element is adapted to be swivelled between a first non-use position and a second use position; and a head-rest made of an elastic material, the head-rest having an opening therein for receiving the carrying element so that the head-rest is releasably supported on the carrying element when the head rest is swivelled between the first non-use position and the second use position.

2. The lateral head-rest assembly of claim 1, wherein the elongated support bar comprises a front bar and a rear bar for clamping the supporting tubes therebetween.

3. The lateral head-rest assembly of claim 2, wherein the front bar and rear bar each have one or more symmetrical recesses such that when the front bar is attached to the rear bar the symmetrical recesses form a clamping space.

4. The lateral head-rest assembly of claim 3, wherein the seating furniture is an automobile seat.

5. The lateral head-rest assembly of claim 4, wherein the front bar and rear bar are attached to the supporting tubes of the neck-rest for the automobile seat by screws such that the supporting tubes occupy all or a portion of the clamping space.

6. The lateral head-rest assembly of claim 2, wherein the front bar and rear bar each have dovetailed guide elements such that the bars are prevented from becoming mispositioned relative to each other during the procedure of being attached to each other.

7. The lateral head-rest assembly of claim 1, wherein the clamping means consists of a soft polyurethane with a rigid core arranged inside.

8. The lateral head-rest assembly of claim 1, wherein the head-rest is cylindrical.

9. The lateral head-rest assembly of claim 8, wherein the opening is arranged eccentrically in the head-rest.

10. The lateral head-rest assembly of claim 1, wherein the support bar on which the carrying element is located has an axle at the first end, and the carrying element swivels around the axle from said non-use position to said use position.

11. The lateral head-rest assembly of claim 1, wherein the head-rest has slots which extend longitudinally along the opening to provide the headrest with a grip on the carrying element.

12. The lateral head-rest of claim 11, wherein the portion of the carrying element which is inserted into the opening has a circumferential groove, and the head-rest has a spring element arranged inside the opening, wherein the spring element is engaged when the head-rest is mounted on the carrying element to axially secure the head-rest to the carrying element.

* * * * *